(12) United States Patent
Hori et al.

(10) Patent No.: US 10,868,891 B2
(45) Date of Patent: Dec. 15, 2020

(54) VEHICLE INFORMATION TRANSMISSION SYSTEM

(71) Applicants: TOYOTA JIDOSHA KABUSHIKI KAISHA, Toyota (JP); AISIN AW CO., LTD., Anjo (JP)

(72) Inventors: Takashige Hori, Aisai (JP); Kuniaki Tanaka, Nagoya (JP); Eiji Murata, Nissin (JP); Masatoshi Takahara, Okazaki (JP); Kouji Maeno, Fuchu (JP); Toshio Kato, Anjo (JP); Shoji Kamiya, Anjo (JP)

(73) Assignees: TOYOTA JIDOSHA KABUSHIKI KAISHA, Toyota (JP); AISIN AW CO., LTD., Anjo (JP)

( * ) Notice: Subject to any disclaimer, the term of this patent is extended or adjusted under 35 U.S.C. 154(b) by 205 days.

(21) Appl. No.: 15/643,017

(22) Filed: Jul. 6, 2017

(65) Prior Publication Data
US 2018/0013862 A1    Jan. 11, 2018

(30) Foreign Application Priority Data
Jul. 8, 2016   (JP) ................................ 2016-136244

(51) Int. Cl.
| | | |
|---|---|---|
| *H04L 29/06* | (2006.01) | |
| *H04L 29/08* | (2006.01) | |
| *G07C 5/00* | (2006.01) | |

(52) U.S. Cl.
CPC .............. *H04L 67/42* (2013.01); *G07C 5/008* (2013.01); *H04L 67/12* (2013.01)

(58) Field of Classification Search
CPC .......... H04L 67/42; H04L 67/12; G07C 5/008
See application file for complete search history.

(56) References Cited

U.S. PATENT DOCUMENTS

| | | | |
|---|---|---|---|
| 5,825,286 A * | 10/1998 | Coulthard | ............. B60C 23/009 340/447 |
| 10,210,772 B2 * | 2/2019 | Tamir | ............... G08G 1/096741 |

(Continued)

FOREIGN PATENT DOCUMENTS

| | | | |
|---|---|---|---|
| JP | 2002-228552 A | 8/2002 | |
| JP | 2004-302675 A | 10/2004 | |

(Continued)

*Primary Examiner* — Shirley X Zhang
(74) *Attorney, Agent, or Firm* — Hunton Andrews Kurth LLP

(57) ABSTRACT

A vehicle information transmission system that carries out communication with a management server that manages a vehicle includes an electronic control unit. The electronic control unit is configured to acquire vehicle information in accordance with a third sampling pattern that is a combination of a first sampling pattern and a second sampling pattern. The vehicle information is transferred within an in-vehicle network installed in the vehicle. The first sampling pattern is a sampling pattern in which the vehicle information is sampled at a change point at which a predetermined change has occurred. The second sampling pattern is a sampling pattern in which the vehicle information is sampled at intervals of a predetermined period. The electronic control unit is configured to transmit the acquired vehicle information to the management server.

5 Claims, 13 Drawing Sheets

(56) References Cited

U.S. PATENT DOCUMENTS

| | | | | |
|---|---|---|---|---|
| 2002/0035422 A1* | 3/2002 | Sasaki | ............ | G07C 5/085 |
| | | | | 701/32.2 |
| 2002/0103583 A1 | 8/2002 | Ohmura et al. | | |
| 2011/0035147 A1 | 2/2011 | Kimishima | | |
| 2011/0130905 A1* | 6/2011 | Mayer | ............ | G07C 5/008 |
| | | | | 701/22 |
| 2013/0302758 A1* | 11/2013 | Wright | ............ | G07C 5/008 |
| | | | | 434/65 |
| 2014/0094992 A1* | 4/2014 | Lambert | ............ | G07C 5/008 |
| | | | | 701/1 |
| 2014/0195071 A1* | 7/2014 | Hunt | ............ | G07C 5/085 |
| | | | | 701/1 |
| 2015/0235323 A1* | 8/2015 | Oldham | ............ | G06Q 40/08 |
| | | | | 701/31.5 |
| 2016/0364921 A1* | 12/2016 | Iyoda | ............ | G07C 5/008 |
| 2017/0166217 A1* | 6/2017 | Sbianchi | ............ | B60W 40/109 |

FOREIGN PATENT DOCUMENTS

| | | | |
|---|---|---|---|
| JP | 2006338384 | A | 12/2006 |
| JP | 2004-241385 | A | 9/2007 |
| JP | 2009085798 | A | 4/2009 |
| JP | 2011-038884 | A | 2/2011 |
| JP | 2011158446 | A | 8/2011 |
| JP | 2014078261 | A | 5/2014 |
| JP | 2016066907 | A | 4/2016 |
| JP | 2016071497 | A | 5/2016 |

\* cited by examiner

SAMPLING PERIOD   201 202

SAMPLING PERIOD

FIG. 8A

SAMPLING PATTERN DEFINITION INFORMATION — 810

| SAMPLING PATTERN NUMBER | SAMPLING PATTERN NAME | TIMING AT WHICH VEHICLE INFORMATION IS SAMPLED |
|---|---|---|
| 1 | SIMPLE SAMPLING PATTERN | TIMING AT WHICH SAMPLING PERIOD HAS ELAPSED |
| 2 | CHANGE POINT SAMPLING PATTERN | TIMING AT WHICH VEHICLE INFORMATION HAS CHANGED |
| 3 | SIMPLE AND CHANGE POINT SAMPLING PATTERN | TIMING AT WHICH SAMPLING PERIOD HAS ELAPSED TIMING AT WHICH VEHICLE INFORMATION HAS CHANGED |
|  |  |  |

FIG. 8B

SAMPLING PATTERN MANAGEMENT INFORMATION (VEHICLE ID = C3) — 823
SAMPLING PATTERN MANAGEMENT INFORMATION (VEHICLE ID = C2) — 822
SAMPLING PATTERN MANAGEMENT INFORMATION (VEHICLE ID = C1) — 821

| INFORMATION ID | SAMPLING PATTERN NUMBER |
|---|---|
| 0X0AA | 1 |
| 0XB4 | 1 |
| 0x2C1 | 2 |
| 0x6C0 | 3 |
| ... | ... |

FIG. 9

| TIME | INFORMATION ID | | | | |
|---|---|---|---|---|---|
| | 0X0AA | 0XB4 | 0x2C1 | 0x6C0 | ... |
| ... | ... | ... | ... | ... | ... |
| 10:23:15:1 ON NOVEMBER 5, 2015 | | | | | |
| 10:23:15:2 ON NOVEMBER 5, 2015 | | | | | |
| 10:23:15:3 ON NOVEMBER 5, 2015 | | | | | |
| 10:23:15:4 ON NOVEMBER 5, 2015 | | | | | |
| 10:23:15:5 ON NOVEMBER 5, 2015 | | | | | |

COLLECTED INFORMATION (VEHICLE ID = C1) — 910
COLLECTED INFORMATION (VEHICLE ID = C2) — 920
COLLECTED INFORMATION (VEHICLE ID = C3) — 930
911

VEHICLE INFORMATION TRANSMISSION SYSTEM

INCORPORATION BY REFERENCE

The disclosure of Japanese Patent Application No. 2016-136244 filed on Jul. 8, 2016 including the specification, drawings and abstract is incorporated herein by reference in its entirety.

BACKGROUND

1. Technical Field

The disclosure relates to a vehicle information transmission system.

2. Description of Related Art

Conventionally, there is known a vehicle information transmission system that transmits vehicle information held in a vehicle to an information center via a network (see, for example, Japanese Patent Application Publication No. 2011-038884 (JP 2011-038884 A), or the like).

The vehicle information transmission system, for example, acquires vehicle information, which is transferred within an in-vehicle network, by sampling the vehicle information at intervals of a predetermined sampling period, and then transmits the sampled vehicle information to the information center. Thus, the information center is able to keep track of the behavior of the vehicle by analyzing the received vehicle information (vehicle information acquired at intervals of a sampling period).

SUMMARY

However, in the case of the vehicle information transmission system that is configured to sample vehicle information at intervals of the predetermined sampling period, if the sampling period is short, the amount of information to be acquired becomes enormous. In this case, storage capacity tightens in both the vehicle and the information center, and, in addition, communication load between the vehicle and the information center increases.

On the other hand, by focusing attention on the fact that, if there is no change in the behavior of the vehicle, vehicle information that is transferred within the in-vehicle network also does not change, it is conceivable that the vehicle information transmission system is configured to sample vehicle information only at a change point in vehicle information. With such a configuration, it is possible to not only significantly reduce the amount of information to be acquired in order to keep track of the behavior of the vehicle but also accurately detect the timing at which the behavior of the vehicle has changed.

However, in the case of the above configuration, if the vehicle information transmission system fails to acquire vehicle information in sampling at a change point, it is difficult to keep track of the behavior of the vehicle, which has occurred at the change point.

This disclosure provides a vehicle information transmission system that transmits vehicle information and that is able to keep track of the behavior of a vehicle even when the vehicle information transmission system fails to acquire vehicle information in sampling at a change point.

According to an aspect of the disclosure, a vehicle information transmission system has the following configuration.

That is, the vehicle information transmission system that carries out communication with a management server that manages a vehicle includes an electronic control unit. The electronic control unit is configured to acquire vehicle information in accordance with a third sampling pattern that is a combination of a first sampling pattern and a second sampling pattern. The vehicle information is transferred within an in-vehicle network installed in the vehicle. The first sampling pattern is a sampling pattern in which the vehicle information is sampled at a change point at which a predetermined change has occurred. The second sampling pattern is a sampling pattern in which the vehicle information is sampled at intervals of a predetermined period. The electronic control unit is configured to transmit the acquired vehicle information to the management server.

With the vehicle information transmission system, the electronic control unit acquires vehicle information in accordance with the third sampling pattern that is a combination of the first sampling pattern and the second sampling pattern. The vehicle information is transferred within the in-vehicle network installed in the vehicle. The first sampling pattern is a sampling pattern in which the vehicle information is sampled at a change point at which the predetermined change has occurred. The second sampling pattern is a sampling pattern in which the vehicle information is sampled at intervals of the predetermined period.

Thus, the vehicle information transmission system is able to acquire both vehicle information at a change point and vehicle information at intervals of the predetermined period. As a result, even when vehicle information at a change point was not able to be acquired, it is possible to acquire vehicle information at intervals of the predetermined period as vehicle information before the next change point is detected.

With the vehicle information transmission system, the electronic control unit transmits the acquired vehicle information to the management server.

Thus, even when vehicle information at a change point was not able to be acquired, the vehicle information transmission system is able to transmit, to the management server, vehicle information acquired before the next change point is detected. As a result, the management server is able to keep track of the behavior of the vehicle at the change point by analyzing vehicle information acquired before the next change point is detected.

According to the disclosure, in the vehicle information transmission system that transmits vehicle information, it is possible to keep track of the behavior of the vehicle even when vehicle information was not able to be acquired in sampling at a change point.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 8A is a view that shows an example of sampling pattern definition information;

FIG. 8B is a view that shows an example of pieces of sampling pattern management information;

FIG. 9 is a view that shows an example of pieces of collected information;

DETAILED DESCRIPTION OF EMBODIMENTS

Figure 1:
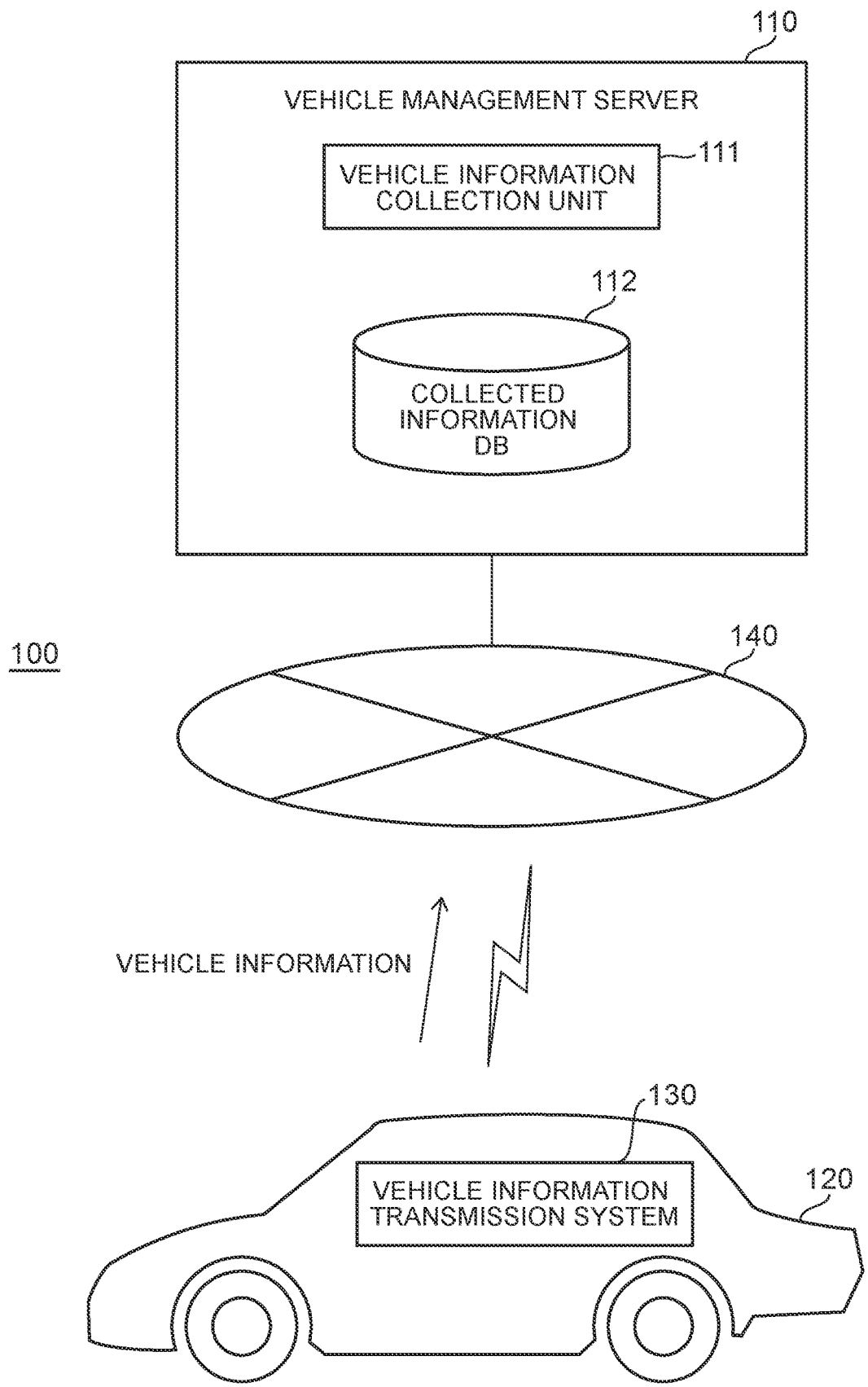
FIG. 1 is a view that shows an example of the overall configuration of a vehicle information collection system.

Hereinafter, embodiments of the disclosure will be described with reference to the accompanying drawings. In the specification and the drawings, like reference numerals denote components having substantially the same functions, and the overlap description is omitted.

First Embodiment

1. Configuration of Vehicle Information Collection System

Initially, the overall configuration of a vehicle information collection system including a vehicle information transmission system according to a first embodiment will be described. FIG. 1 is a view that shows an example of the overall configuration of the vehicle information collection system. As shown in FIG. 1, the vehicle information collection system 100 includes a vehicle management server 110 and a vehicle information transmission system 130. The vehicle management server 110 and the vehicle information transmission system 130 are connected to each other via a network 140.

The vehicle management server 110 is a server device that manages a vehicle 120. A vehicle information collection program is installed in the vehicle management server 110. When the program is executed, the vehicle management server 110 functions as a vehicle information collection unit 111.

The vehicle information collection unit 111 collects vehicle information transmitted from the vehicle information transmission system 130 via the network 140, and stores the vehicle information in a collected information database (hereinafter, abbreviated as DB (database)) 112 as collected information.

The vehicle information transmission system 130 is a system mounted on the vehicle 120. The vehicle information transmission system 130 transmits vehicle information held in the vehicle 120 to the vehicle management server 110 via the network 140. The vehicle information includes any information that is transferred within an in-vehicle network installed in the vehicle 120. The vehicle information transmission system 130 acquires vehicle information, which is transferred within the in-vehicle network, by sampling the vehicle information in accordance with a predetermined sampling pattern, and transmits the sampled vehicle information to the vehicle management server 110.

2. Outline of Sampling Patterns

Figure 2A:
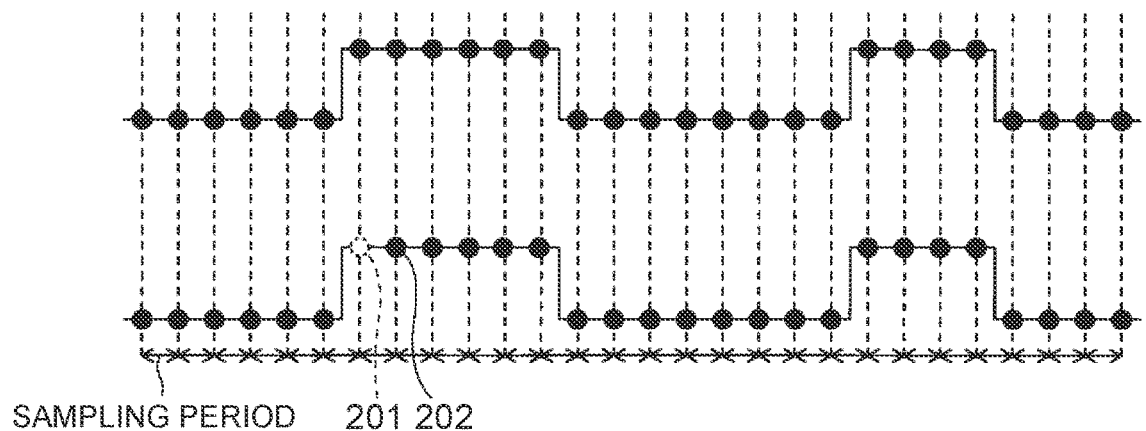
FIG. 2A is a view that show the outline of sampling patterns.
Figure 2B:
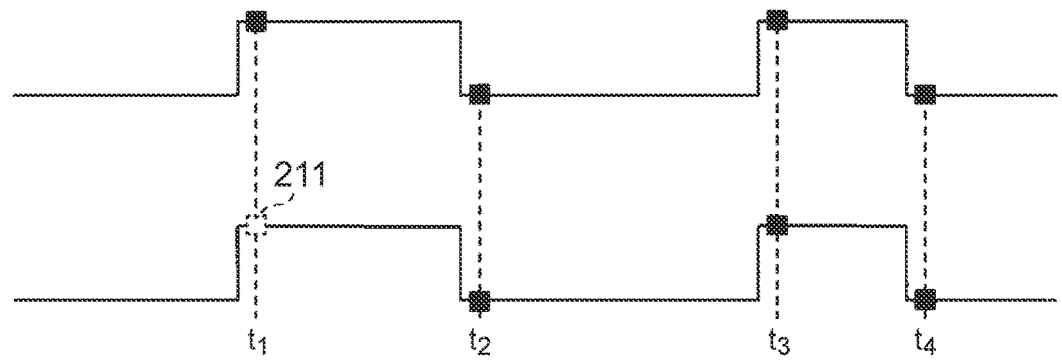
FIG. 2B is a view that show the outline of sampling patterns.
Figure 2C:
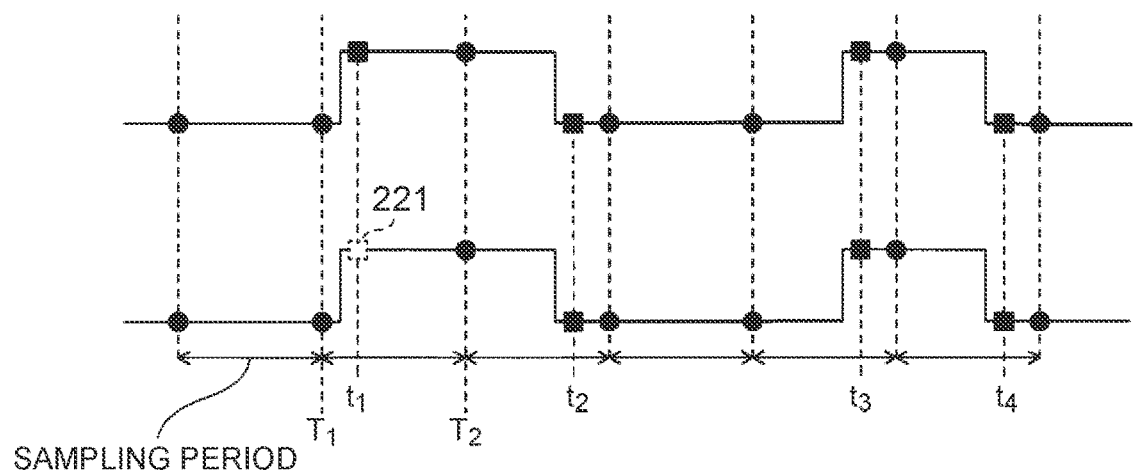
FIG. 2C is a view that show the outline of sampling patterns.

Next, sampling patterns for sampling vehicle information that is transferred within the in-vehicle network installed in the vehicle 120 will be described. FIG. 2A to FIG. 2C are views for illustrating the outline of sampling patterns. The abscissa axis represents time, and the ordinate axis represents the value of vehicle information. In FIG. 2A to FIG. 2C, for the sake of easy illustration, it is assumed that any one of the value "High" and the value "Low" is transferred within the in-vehicle network as vehicle information.

FIG. 2A is a view that shows an example of a simple sampling pattern among existing sampling patterns. Vehicle information is sampled in accordance with the simple sampling pattern at intervals of a predetermined sampling period. Each black circle indicates timing at which vehicle information was sampled. In the case of the simple sampling pattern, since the sampling period is constant, the interval between any adjacent black circles is constant.

The upper view of FIG. 2A shows the case where all the pieces of vehicle information, which are transferred within the in-vehicle network, were able to be acquired at intervals of the predetermined sampling period. On the other hand, the lower view of FIG. 2A shows the case where part of the pieces of vehicle information, which are transferred within the in-vehicle network, was not able to be acquired in predetermined sampling.

In the lower view of FIG. 2A, the white circle 201 indicates that vehicle information was not able to be acquired. A state where "vehicle information is not able to be acquired", for example, means a state that occurs, for example, when transmission of vehicle information from the vehicle information transmission system 130 to the vehicle management server 110 has temporarily stagnated. When transmission of vehicle information has temporarily stagnated, vehicle information that has not been transmitted yet is left for a certain period of time in a storage (temporary holding unit) in the vehicle information transmission system 130. For this reason, if vehicle information is sampled at the next sampling timing at this time, the next vehicle information is not able to be written into the storage. This is the state where "vehicle information is not able to be acquired".

In the case of the lower view of FIG. 2A, vehicle information was not able to be acquired at the timing indicated by the white circle 201; however, vehicle information is able to be acquired at the next sampling timing (the timing indicated by the black circle 202). For this reason, according to the simple sampling pattern shown in the lower view of FIG. 2A, even when vehicle information was not able to be acquired, the fact that the value of vehicle information has changed from "Low" to "High" (a change of the behavior of the vehicle) is able to be detected.

However, in the case of the simple sampling pattern, the amount of information to be acquired is enormous, so storage capacity tightens in both the vehicle 120 and the vehicle management server 110, and, in addition, communication load between the vehicle 120 and the vehicle management server 110 increases.

On the other hand, FIG. 2B is a view that shows an example of a change point sampling pattern among the existing sampling patterns. In the change point sampling pattern, a change point in vehicle information is detected and vehicle information is acquired by sampling vehicle information at the change point. A change point indicates timing at which a change in vehicle information per unit time becomes larger than a predetermined value.

In FIG. 2B, each black square indicates timing at which vehicle information was sampled in accordance with the change point sampling pattern. In the case of the change point sampling pattern, vehicle information is sampled at the timing at which the vehicle information has changed (the timing at which the value of vehicle information has changed from "Low" to "High" or the timing at which the value of vehicle information has changed from "High" to "Low"). In FIG. 2B, time at which each change point has been detected is $t_1$, $t_2$, $t_3$, or $t_4$.

The upper view of FIG. 2B shows the case where vehicle information that is transferred within the in-vehicle network was sampled in accordance with the change point sampling pattern and then vehicle information was able to be acquired at all the change points. The following changes are found from the upper view of FIG. 2B as the behaviors of the vehicle 120.

Vehicle information has changed from "Low" to "High" at time $t_1$.
The state where vehicle information is "High" has continued from time $t_1$ to time $t_2$.
Vehicle information has changed from "High" to "Low" at time $t_2$.
The state where vehicle information is "Low" has continued from time $t_2$ to time $t_3$.
Vehicle information has changed from "Low" to "High" at time $t_3$.
The state where vehicle information is "High" has continued from time $t_3$ to time $t_4$.
Vehicle information has changed from "High" to "Low" at time $t_4$.

On the other hand, the lower view of FIG. 2B shows the case where vehicle information that is transferred within the in-vehicle network was sampled in accordance with the change point sampling pattern but vehicle information was not able to be acquired at part of change points. In the lower view of FIG. 2B, the white square 211 indicates that vehicle information was not able to be acquired in change point sampling. The following changes are not found from the lower view of FIG. 2B among the behaviors of the vehicle, which are able to be found from the upper view of FIG. 2B (it is found that the behavior of the vehicle has not changed until time $t_2$).

Vehicle information has changed from "Low" to "High" at time $t_1$.
The state where vehicle information is "High" has continued from time $t_1$ to time $t_2$.
Vehicle information has changed from "High" to "Low" at time $t_2$.

In this way, in the case of the change point sampling pattern, it is possible to reduce the amount of information to be acquired in order to keep track of the behavior of the vehicle, while, when vehicle information was not able to be acquired at a change point, it is difficult to keep track of the behavior of the vehicle.

FIG. 2C is a view that shows an example of a sampling pattern that is used in the vehicle information transmission system 130 according to the present embodiment. The vehicle information transmission system 130 according to the present embodiment uses a sampling pattern that is a combination of the change point sampling pattern and the simple sampling pattern (change point and simple sampling pattern).

In the case of the sampling pattern that is used in the vehicle information transmission system 130 according to the present embodiment, for example, the sampling period of the simple sampling pattern is set so as to be longer than the sampling period of the existing simple sampling pattern shown in FIG. 2A. This is to reduce the amount of information to be acquired in order to keep track of the behavior of the vehicle as compared to the case of the existing simple sampling pattern.

In the case of the sampling pattern that is used in the vehicle information transmission system 130 according to the present embodiment, for example, the sampling period of the simple sampling pattern is set so as to be shorter in time interval than an interval at which a change point occurs. This is to make it possible to acquire vehicle information in accordance with the simple sampling pattern before the next change point is detected even when vehicle information was not able to be acquired in sampling at a change point.

In FIG. 2C, the black circle indicates that vehicle information was acquired in accordance with the simple sampling pattern, and the black square indicates that vehicle information was acquired in accordance with the change point sampling pattern.

The upper view of FIG. 2C shows the case where all the pieces of vehicle information, which are transferred within the in-vehicle network, were able to be acquired in accordance with both the simple sampling pattern and the change point sampling pattern.

On the other hand, the lower view of FIG. 2C shows the case where vehicle information that is transferred within the in-vehicle network was sampled in accordance with the change point and simple sampling pattern but vehicle information was not able to be acquired in sampling at part of change points. In the lower view of FIG. 2C, the white square 221 indicates that vehicle information was not able to be acquired.

However, with the change point and simple sampling pattern, even in such a case, not the entire behavior of the vehicle is not able to be kept track of. Specifically, the behavior of the vehicle, which was not able to be kept track of from the lower view of FIG. 2B, is found from the lower view of FIG. 2C as follows.

Vehicle information was "Low" at time $T_1$.
Vehicle information has changed from "Low" to "High" at any timing between time $T_1$ and time $T_2$.
Vehicle information was "High" at time $T_2$.
Vehicle information has changed from "High" to "Low" at time $t_2$.

That is, it is possible to acquire such the behavior of the vehicle that vehicle information has changed from "Low" to "High" and has changed from "High" to "Low" before time $t_2$.

In this way, with the sampling pattern (change point and simple sampling pattern) that is used in the vehicle information transmission system 130 according to the present embodiment, it is possible to reduce the amount of information to be acquired in order to keep track of the behavior of the vehicle. Furthermore, with the sampling pattern (change point and simple sampling pattern) that is used in the vehicle information transmission system 130 according to the present embodiment, it is possible to keep track of the behavior of the vehicle even when vehicle information was not able to be acquired in sampling at a change point.

3. System Configuration of Vehicle Information Transmission System

Figure 3:
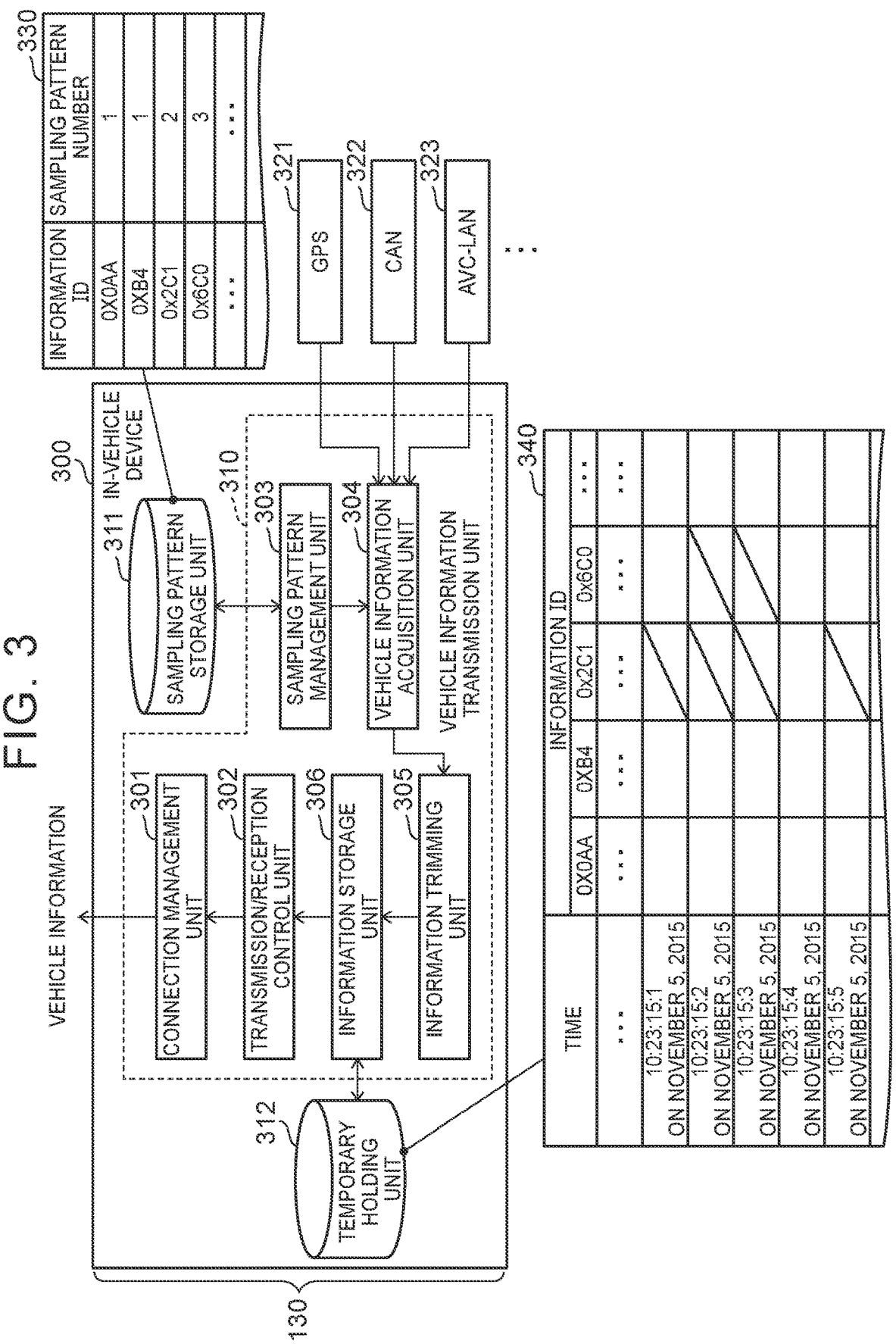
FIG. 3 is a view that shows an example of the system configuration of the vehicle information transmission system.

Next, the system configuration of the vehicle information transmission system 130 will be described. FIG. 3 is a view that shows an example of the system configuration of the vehicle information transmission system. As shown in FIG. 3, the vehicle information transmission system 130 includes an in-vehicle device 300, a global positioning system (GPS) 321, a controller area network (CAN) 322 and an audio visual communication-local area network (AVC-LAN) 323.

The GPS 321 is a device that outputs the positional information of the vehicle 120, which is an example of vehicle information. The GPS 321 constitutes part of the in-vehicle network.

The CAN 322 is an example of the in-vehicle network. The CAN 322 is used to transfer vehicle information associated with control over traveling of the vehicle 120 or vehicle information associated with control over the vehicle body.

The AVC-LAN 323 is an example of the in-vehicle network. The AVC-LAN 323 is used to transfer vehicle information, such as image data and voice data.

The in-vehicle device 300 is implemented by, for example, a display audio (DA) or an audio visual navigation (AVN). A vehicle information transmission program is installed in the in-vehicle device 300. When the program is executed, the in-vehicle device 300 functions as a vehicle information transmission unit 310.

The vehicle information transmission unit 310 includes a connection management unit 301, a transmission/reception control unit 302, a sampling pattern management unit 303, a vehicle information acquisition unit 304, an information trimming unit 305 and an information storage unit 306.

The connection management unit 301 manages connection and interruption of communication with the vehicle management server 110. The transmission/reception control unit 302 controls transmission of vehicle information to the vehicle management server 110 in a state where communication is established with the vehicle management server 110.

The sampling pattern management unit 303 manages sampling patterns for sampling vehicle information that is transferred within the in-vehicle network. In the present embodiment, the sampling pattern management unit 303 manages at least three sampling patterns, that is, a simple sampling pattern, a change point sampling pattern and a change point and simple sampling pattern. The sampling pattern management unit 303 reads a sampling pattern stored in a sampling pattern storage unit 311, and sets the sampling pattern in the vehicle information acquisition unit 304.

Sampling pattern information 330 shown in FIG. 3 is an example of a list of sampling patterns stored in the sampling pattern storage unit 311. The sampling pattern information 330 contains "information ID" and "sampling pattern number" as the items of information.

An identifier for identifying the type of vehicle information that is transferred within the in-vehicle network is stored in "information ID". An identifier for identifying the type of sampling pattern is stored in "sampling pattern number". In the sampling pattern information 330, sampling pattern number "1" indicates the simple sampling pattern, and sampling pattern number "2" indicates the change point sampling pattern. Sampling pattern number "3" indicates the change point and simple sampling pattern.

In this way, the sampling pattern management unit 303 manages the sampling pattern information 330 such that a sampling pattern of different type is allowed to be set for each type of vehicle information.

The vehicle information acquisition unit 304 acquires vehicle information, which is transferred within the in-vehicle network, by sampling the vehicle information in accordance with the sampling pattern set by the sampling pattern management unit 303.

The information trimming unit 305 executes trimming process over the vehicle information acquired by the vehicle information acquisition unit 304. In the trimming process, vehicle information is trimmed into predetermined transmission format.

The information storage unit 306 temporarily holds the trimmed vehicle information in a temporary holding unit 312. The vehicle information held in the temporary holding unit 312 is sequentially read and transmitted to the vehicle management server 110 by the transmission/reception control unit 302.

Temporary holding information 340 shown in FIG. 3 is an example of temporary holding information that is held in the temporary holding unit 312. The temporary holding information 340 contains "time" and "information ID" as the items of information.

Time at which the vehicle information acquisition unit 304 has acquired vehicle information is held in "time". Vehicle information acquired at each time is held in association with an identifier for identifying the type of the vehicle information held in "information ID".

For example, vehicle information that is identified by information ID "0X0AA" and vehicle information that is identified by information ID "0XB4" are acquired in accordance with the simple sampling pattern (sampling period of 100 [msec]). For this reason, pieces of vehicle information, which have been acquired in sampling at intervals of 100 msec are held in the temporary holding information 340.

On the other hand, vehicle information that is identified by information ID "0x2C1" is acquired in accordance with the change point sampling pattern, so vehicle information acquired at "10:23:15:4 on Nov. 5, 2015" at which a change point has been detected is held in the temporary holding information 340.

Vehicle information that is identified by information ID "0x6C0" is acquired in accordance with the change point and simple sampling pattern. In the example of FIG. 3, the sampling period of the change point and simple sampling pattern is 400 [msec], so pieces of vehicle information, which have been acquired in sampling at intervals of 400 [msec], are held in the temporary holding information 340. Furthermore, vehicle information acquired at "10:23:15:4 on Nov. 5, 2015" at which a change point has been detected is held in the temporary holding information 340.

4. Hardware Configuration of In-vehicle Device

Figure 4:
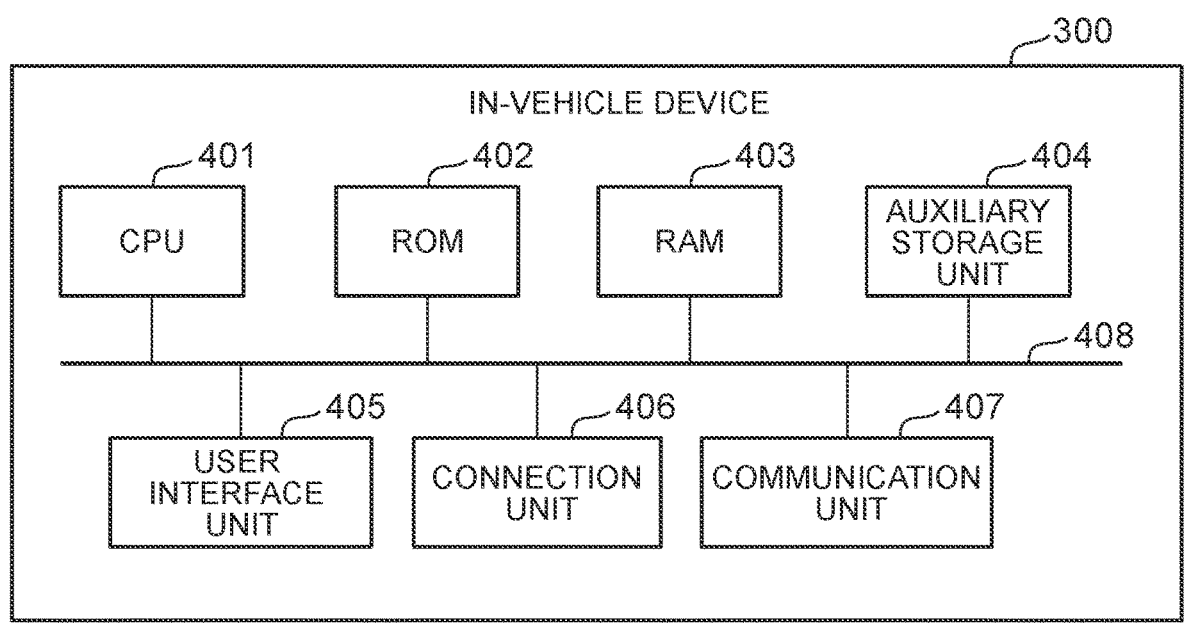
FIG. 4 is a view that shows an example of the hardware configuration of an in-vehicle device.

Next, the hardware configuration of the in-vehicle device 300 will be described. FIG. 4 is a view that shows an example of the hardware configuration of the in-vehicle device. The in-vehicle device 300 includes a central processing unit (CPU) 401, a read only memory (ROM) 402, a random access memory (RAM) 403, an auxiliary storage unit 404, a user interface unit 405, a connection unit 406 and a communication unit 407. The units of the in-vehicle device 300 are connected to one another via a bus 408.

The CPU 401 is a computer that executes a program stored in the ROM 402 and a program (vehicle information transmission program, or the like) stored in the auxiliary storage unit 404 while using the RAM 403 as a work area and a temporary holding area (for example, the temporary holding unit 312). The CPU 401 uses information (sampling pattern information, or the like) stored in the sampling pattern storage unit 311 that is implemented by the auxiliary storage unit 404 in executing these programs.

The user interface unit 405 is a device that allows input of required information at the time when the CPU 401 executes a program or displays information generated as a result of execution of a program on the CPU 401.

The connection unit 406 is a connection device for connection with the GPS 321, the CAN 322, the AVC-LAN 323, or the like. The communication unit 407 is a communication device for communicating with the vehicle management server 110 via the network 140.

5. Flow of Vehicle Information Transmission Process

Figure 5:
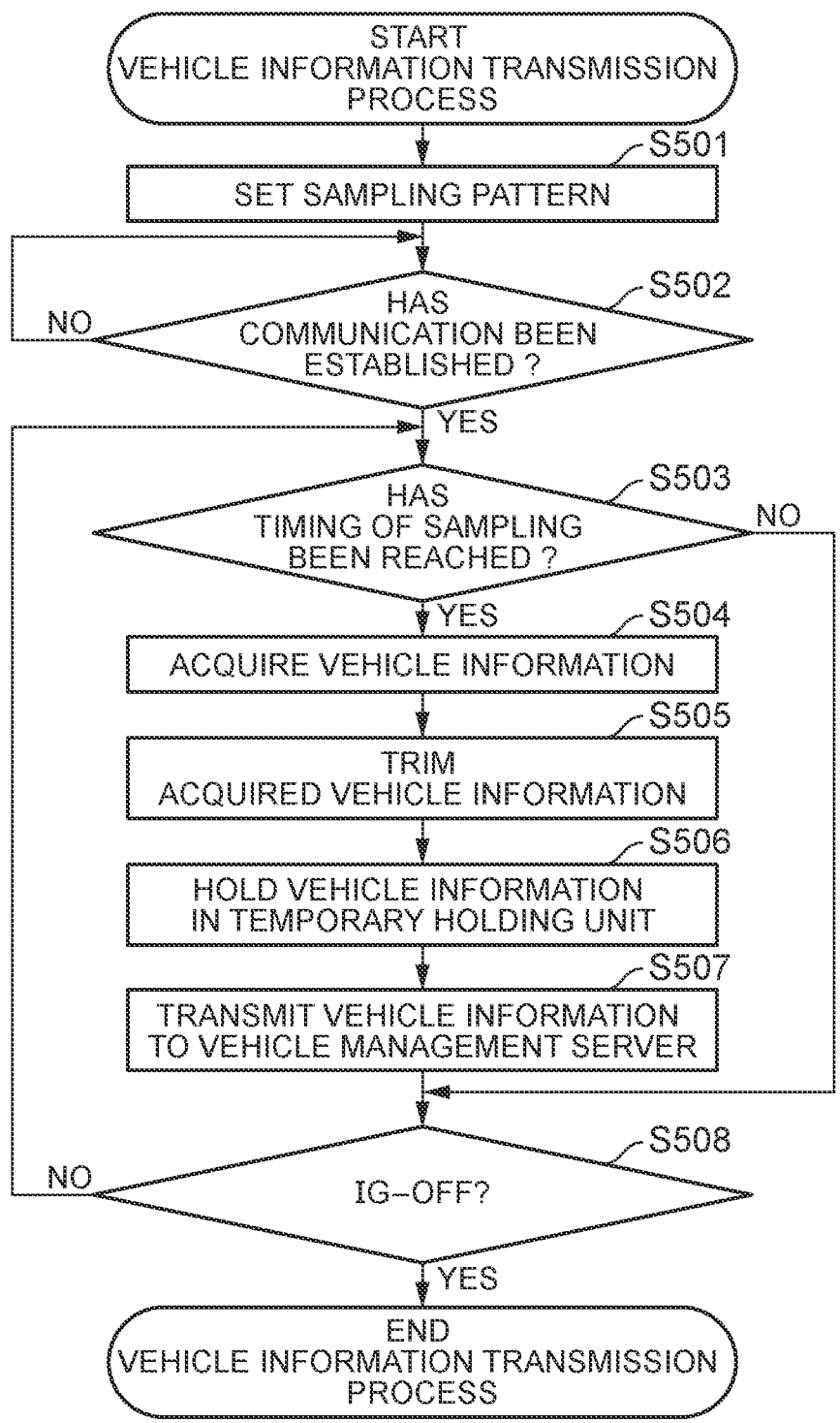
FIG. 5 is a flowchart that shows the flow of a vehicle information transmission process.

Next, the flow of vehicle information transmission process that is executed by the vehicle information transmission system 130 will be described. FIG. 5 is a flowchart that shows the flow of vehicle information transmission process.

When the vehicle 120 is placed in an IG-ON state, the vehicle information transmission process shown in FIG. 5 is started. In step S501, the sampling pattern management unit 303 reads a sampling pattern stored in the sampling pattern storage unit 311, and sets the sampling pattern in the vehicle information acquisition unit 304.

In step S502, the connection management unit 301 executes the process of communication connection with the vehicle management server 110, and determines whether communication has been established with the vehicle management server 110. When it is determined in step S502 that communication has not been established with the vehicle management server 110, the process waits until communication is established. On the other hand, when it is determined in step S502 that communication has been established with the vehicle management server 110, the process proceeds to step S503.

In step S503, the vehicle information acquisition unit 304 determines whether the timing of sampling according to the set sampling pattern (for example, the timing of the change point sampling pattern or the timing of the simple sampling pattern) has been reached. When it is determined that the timing of sampling according to the set sampling pattern has not been reached, the process proceeds to step S508.

On the other hand, when it is determined that the timing of sampling according to the set sampling pattern has been reached, the process proceeds to step S504. In step S504, vehicle information that is identified by information ID corresponding to the set sampling pattern is acquired from the GPS 321, the CAN 322 and the AVC-LAN 323.

In step S505, the information trimming unit 305 executes trimming process over the vehicle information that the vehicle information acquisition unit 304 has acquired in step S504.

In step S506, the information storage unit 306 holds the vehicle information trimmed in step S505 in the temporary holding unit 312.

In step S507, the transmission/reception control unit 302 sequentially reads vehicle information held in the temporary holding unit 312 and transmits the vehicle information to the vehicle management server 110.

In step S508, the connection management unit 301 determines whether the vehicle 120 is placed in an IG-OFF state. When it is determined that the vehicle 120 is not placed in the IG-OFF state, the process returns to step S503. On the other hand, when it is determined that the vehicle 120 is placed in the IG-OFF state, communication with the vehicle management server 110 is interrupted, and the vehicle information transmission process is ended.

6. Conclusion

As is apparent from the above description, the vehicle information transmission system 130 according to the present embodiment is configured to acquire vehicle information, which is transferred within the in-vehicle network, in accordance with the change point and simple sampling pattern. The sampling period of the change point and simple sampling pattern is set to a predetermined period (however, a period longer than the sampling period of the existing simple sampling pattern) such that the predetermined period is shorter in time interval than an interval at which a change point occurs. That is, the sampling period of the change point and simple sampling pattern is set to a period longer than the sampling period of only the simple sampling pattern as in the case of the existing art.

Thus, even when vehicle information was not able to be acquired in sampling at a change point, the vehicle information transmission system 130 is able to acquire vehicle information in accordance with the simple sampling pattern after the change point and before the next change point.

That is, even when vehicle information was not able to be acquired in sampling at a change point, it is possible to find the behavior of the vehicle by analyzing vehicle information acquired in accordance with the simple sampling pattern.

Second Embodiment

In the above-described first embodiment, the sampling pattern management unit 303 is configured to read a predetermined sampling pattern stored in the sampling pattern storage unit 311 and set the sampling pattern in the vehicle information acquisition unit 304.

In contrast, in a second embodiment, the sampling pattern that is set in the vehicle information acquisition unit 304 is allowed to be changed on the basis of a command from the vehicle management server 110. Hereinafter, the second embodiment will be described in detail.

1. Configuration of Vehicle Information Collection System

Figure 6:
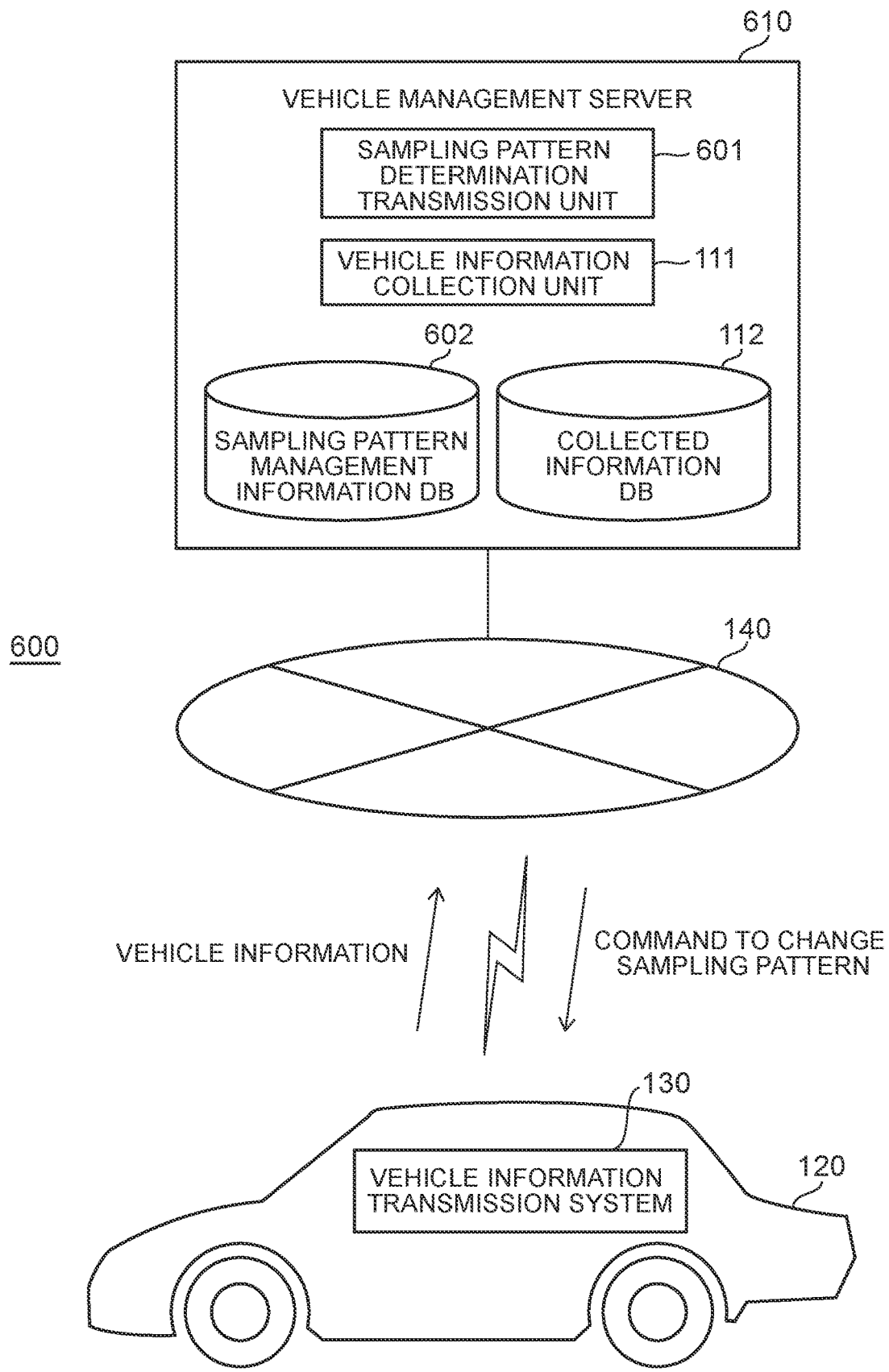
FIG. 6 is a view that shows an example of the overall configuration of a vehicle information collection system.

Initially, the overall configuration of a vehicle information collection system including a vehicle information transmission system according to the second embodiment will be described. FIG. 6 is a view that shows an example of the overall configuration of the vehicle information collection system. The vehicle information collection system 600 shown in FIG. 6 differs from the vehicle information collection system 100 shown in FIG. 1 in that, in the case of the vehicle information collection system 600 shown in FIG. 6, a vehicle management server 610 includes a sampling pattern determination transmission unit 601. In the case of the vehicle information collection system 600 shown in FIG. 6, a sampling pattern management information DB 602 is provided.

In the present embodiment, a sampling pattern determination transmission program is installed in the vehicle management server 610, and, when the program is executed, the vehicle management server 610 according to the present embodiment also functions as a sampling pattern determination transmission unit 601.

The sampling pattern determination transmission unit 601 generates sampling pattern management information for managing sampling patterns to be set in the vehicle 120 that is managed by the vehicle management server 610, and stores the sampling patterns in a sampling pattern management information DB 602.

The sampling pattern determination transmission unit 601 analyzes the collected information stored in the collected information DB 112. When the sampling pattern determination transmission unit 601 determines that a change of the sampling pattern is required as a result of analysis, the sampling pattern determination transmission unit 601 rewrites the sampling pattern management information stored in the sampling pattern management information DB 602.

Furthermore, the sampling pattern determination transmission unit 601 transmits a sampling pattern change command containing the rewritten sampling pattern management information to the vehicle 120.

2. Hardware Configuration of Vehicle Management Server

Figure 7:
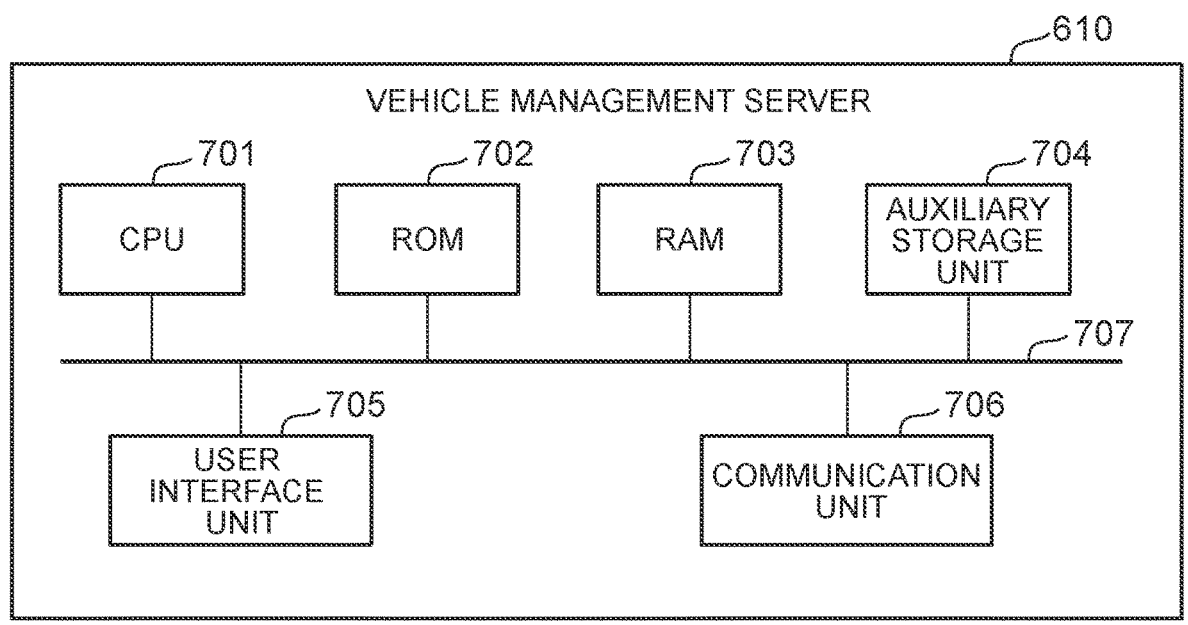
FIG. 7 is a view that shows an example of the hardware configuration of a vehicle management server.

Next, the hardware configuration of the vehicle management server 610 will be described. FIG. 7 is a view that shows an example of the hardware configuration of the vehicle management server.

The vehicle management server 610 includes a CPU 701, a ROM 702, a RAM 703, an auxiliary storage unit 704, a user interface unit 705 and a communication unit 706. The units of the vehicle management server 610 are connected to one another via a bus 707.

The CPU 701 is a computer that executes a program stored in the ROM 702 and a program (a sampling pattern determination transmission program, a vehicle information collection program, or the like) stored in the auxiliary storage unit 704 while using the RAM 703 as a work area. When the CPU 701 executes these programs, the CPU 701 references information (sampling pattern management information) stored in the sampling pattern management information DB 602 that is implemented by the auxiliary storage unit 704 or information (collected information) stored in the collected information DB 112.

The user interface unit 705 is a device that allows input of required information at the time when the CPU 701 executes a program or displays information generated as a result of execution of a program on the CPU 701. The communication unit 706 is a device for communicating with the vehicle management server 110 via the network 140.

3. Description of Information Stored in Sampling Pattern Management Information DB Next, information stored in the sampling pattern management information DB will be described in detail. Sampling pattern definition information and sampling pattern management information are stored in the sampling pattern management information DB 602. The sampling pattern definition information defines each sampling pattern. The sampling pattern management information manages sampling patterns set for each vehicle and each type of vehicle information.

FIG. 8A is a view that shows an example of the sampling pattern definition information. As shown in FIG. 8A, the sampling pattern definition information 810 contains "sampling pattern number", "sampling pattern name" and "timing at which vehicle information is sampled" as the items of information.

An identifier for identifying the type of sampling pattern is stored in "sampling pattern number". In the present embodiment as well, three types (the simple sampling pattern, the change point sampling pattern and the change point and simple sampling pattern) of sampling patterns are allowed to be set in the vehicle information acquisition unit 304.

The name of each sampling pattern that is identified from the sampling pattern number is stored in "sampling pattern name".

The sampling timing of each sampling pattern that is identified from the sampling pattern number is defined in "timing at which vehicle information is sampled".

FIG. 8B is a view that shows an example of pieces of sampling pattern management information. As shown in FIG. 8B, sampling pattern management information is generated for each vehicle and is managed. The example of FIG. 8B shows pieces of sampling pattern management information (821 to 823) for vehicles that are respectively identified by vehicle ID "C1", vehicle ID "C2" and vehicle ID "C3".

As shown in FIG. 8B, each of the pieces of sampling pattern management information (821 to 823) contains "information ID" and "sampling pattern number" as the items of information.

An identifier for identifying the type of vehicle information that is acquired in the vehicle that is identified by the vehicle ID is stored in "information ID".

An identifier for identifying the type of sampling pattern for sampling vehicle information in the vehicle that is identified by the vehicle ID is stored in "sampling pattern number".

4. Description of Collected Information Stored in Collected Information DB

Next, collected information stored in the collected information DB 112 will be described in detail. Vehicle information transmitted by the vehicle information transmission system 130 is stored in the collected information DB 112 as collected information by the vehicle information collection unit 111.

FIG. 9 is a view that shows an example of pieces of collected information. As shown in FIG. 9, pieces of collected information (910 to 930) are stored by vehicles. As shown in FIG. 9, the collected information 910 contains "time" and "information ID" as the items of information. Pieces of vehicle information respectively stored in the items are similar to pieces of vehicle information held in the temporary holding information 340 shown in FIG. 3, so the description thereof is omitted.

The pieces of collected information 910 to 930 stored in the collected information DB 112 are analyzed by the sampling pattern determination transmission unit 601, and then it is determined whether a change of the sampling pattern is required for each type of vehicle information. Hatched information ID "0x2C1" in the collected information 910 indicates that the sampling pattern determination transmission unit 601 determines that a change of the sampling pattern is required.

In this case, in the sampling pattern management information 821 (FIG. 8B) of vehicle ID "C1", the sampling pattern number stored in association with information ID "0x2C1" is changed (for example, "2"→"3"). A change flag associated with the sampling pattern management information 821 (FIG. 8B) of vehicle ID "C1" is set to an on state. Furthermore, when the vehicle that is identified by vehicle ID "C1" is placed in the IG-ON state, a sampling pattern change command containing the changed sampling pattern management information 821 is transmitted to the identified vehicle.

5. Flow of Sampling Pattern Determination Process and Flow of Sampling Pattern Transmission Process Next, the flows of sampling pattern determination process and sampling pattern transmission process that are executed by the vehicle management server 610 will be described.

Figure 10A:
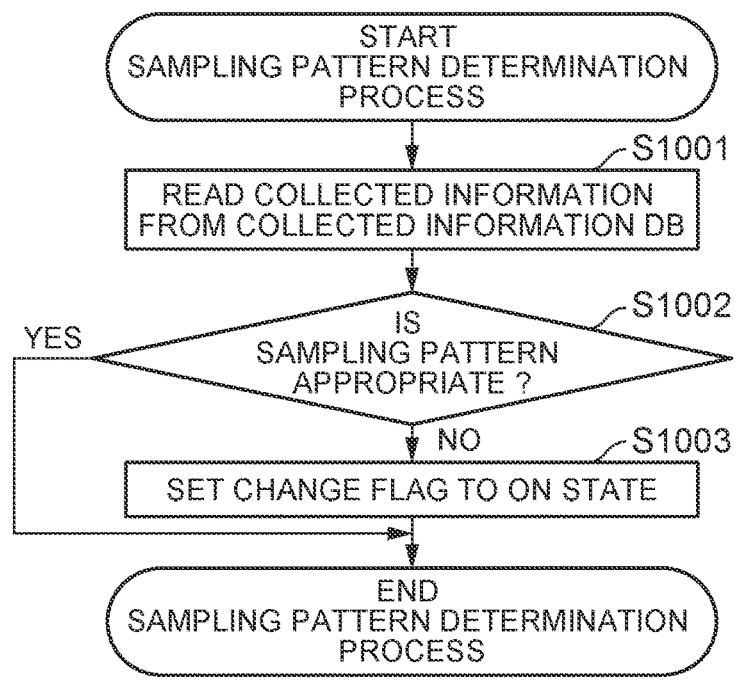
FIG. 10A is a flowchart that shows the flow of a sampling pattern determination process.

FIG. 10A is a flowchart that shows the flow of the sampling pattern determination process. The sampling pattern determination transmission unit 601 executes the sampling pattern determination process at selected timing. In step S1001, the sampling pattern determination transmission unit 601 reads collected information (for example, any one of the pieces of collected information 910 to 930) to be analyzed from the collected information DB 112.

In step S1002, the sampling pattern determination transmission unit 601 analyzes pieces of vehicle information contained in the read collected information, and determines whether the sampling pattern is appropriate.

When it is determined in step S1002 that the sampling pattern is appropriate, the sampling pattern determination process is ended without changing the sampling pattern. On the other hand, when it is determined in step S1002 that the sampling pattern is not appropriate, the process proceeds to step S1003.

In step S1003, the sampling pattern determination transmission unit 601 sets a corresponding change flag to an on state for the sampling pattern management information (FIG. 8B) in which the sampling pattern for acquiring vehicle information is set and that is determined not to be appropriate. After that, the sampling pattern determination transmission unit 601 ends the sampling pattern determination process.

Figure 10B:
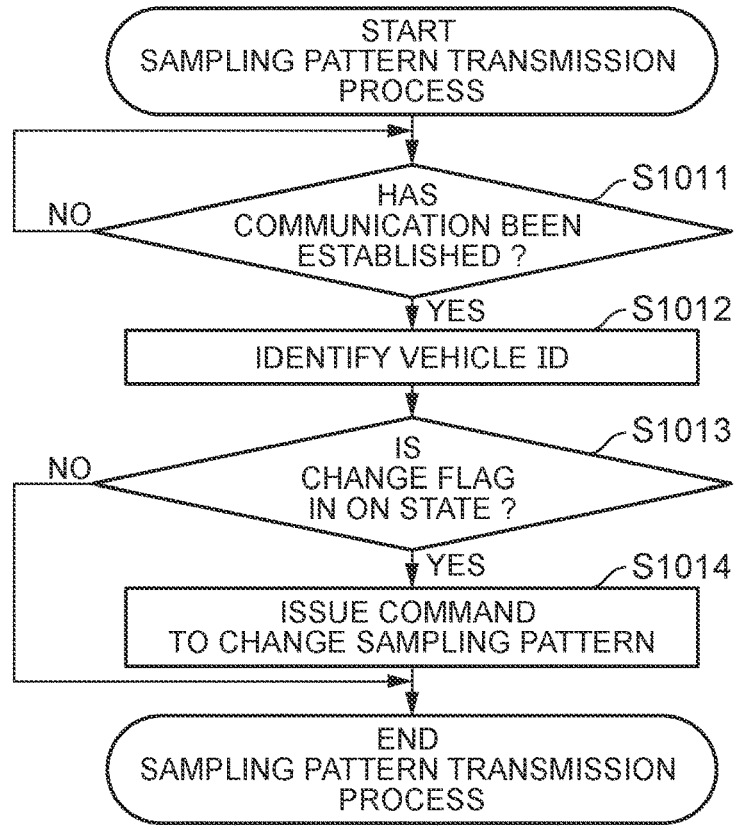
FIG. 10B is a flowchart that shows the flow of a transmission process.

FIG. 10B is a flowchart that shows the flow of the sampling pattern transmission process. In step S1011, the sampling pattern determination transmission unit 601 determines whether communication is established with any of the vehicles. When it is determined in step S1011 that communication is not established, the process waits until communication is established.

On the other hand, when it is determined that communication is established with any of the vehicles, the process proceeds to step S1012. In step S1012, the vehicle ID of the vehicle is identified.

In step S1013, the sampling pattern determination transmission unit 601 determines whether the corresponding change flag is in an on state by referencing the sampling pattern management information corresponding to the identified vehicle ID.

When the change flag is in an off state in step S1013, the sampling pattern transmission process is ended.

On the other hand, when the change flag is in an on state in step S1013, the process proceeds to step S1014.

In step S1014, the sampling pattern determination transmission unit 601 transmits the sampling pattern change command containing the sampling pattern management information corresponding to the identified vehicle ID to the vehicle identified by the vehicle ID. The sampling pattern determination transmission unit 601 sets the change flag associated with the transmitted sampling pattern management information to an off state, and ends the sampling pattern transmission process.

6. System Configuration of Vehicle Information Transmission System

Figure 11:
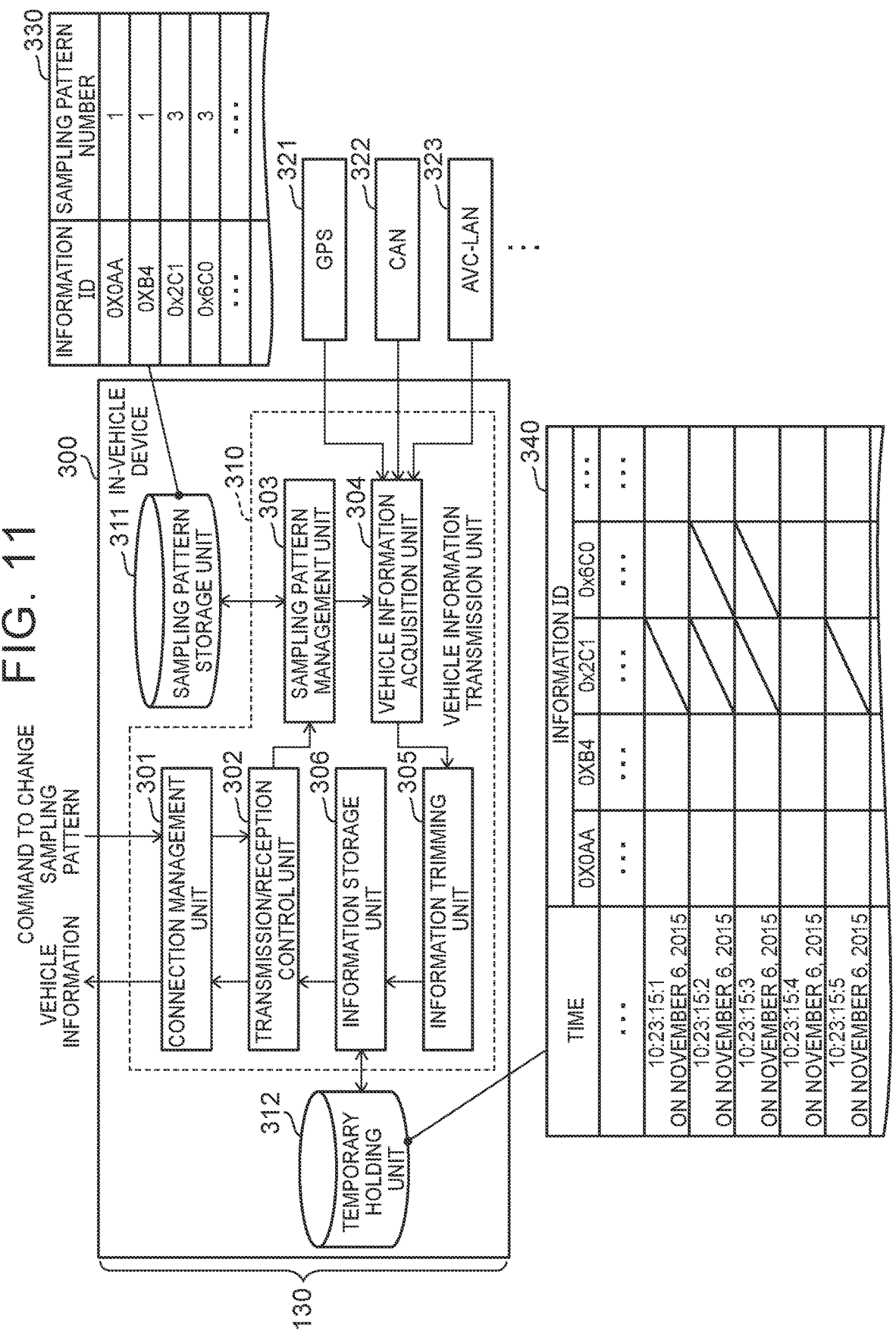
FIG. 11 is a view that shows an example of the system configuration of a vehicle information transmission system.

Next, the system configuration of the vehicle information transmission system 130 according to the second embodiment will be described. FIG. 11 is a view that shows an example of the system configuration of the vehicle information transmission system. The difference from the system configuration shown in FIG. 3 will be mainly described.

The system configuration shown in FIG. 11 differs from the system configuration shown in FIG. 3 in that the transmission/reception control unit 302 receives a sampling pattern change command from the vehicle management server 610 via the connection management unit 301 and provides notification to the sampling pattern management unit 303.

As the sampling pattern management unit 303 receives a sampling pattern change command, the sampling pattern management unit 303 extracts the sampling pattern management information and updates the sampling pattern information 330. In the example of FIG. 11, since the sampling pattern information 330 is updated, the sampling pattern number corresponding to information ID "0x2C1" is changed from "2" to "3".

The sampling pattern management unit 303 further sets the sampling pattern in the vehicle information acquisition unit 304 on the basis of the extracted sampling pattern management information.

7. Flow of Vehicle Information Transmission Process

Figure 12:
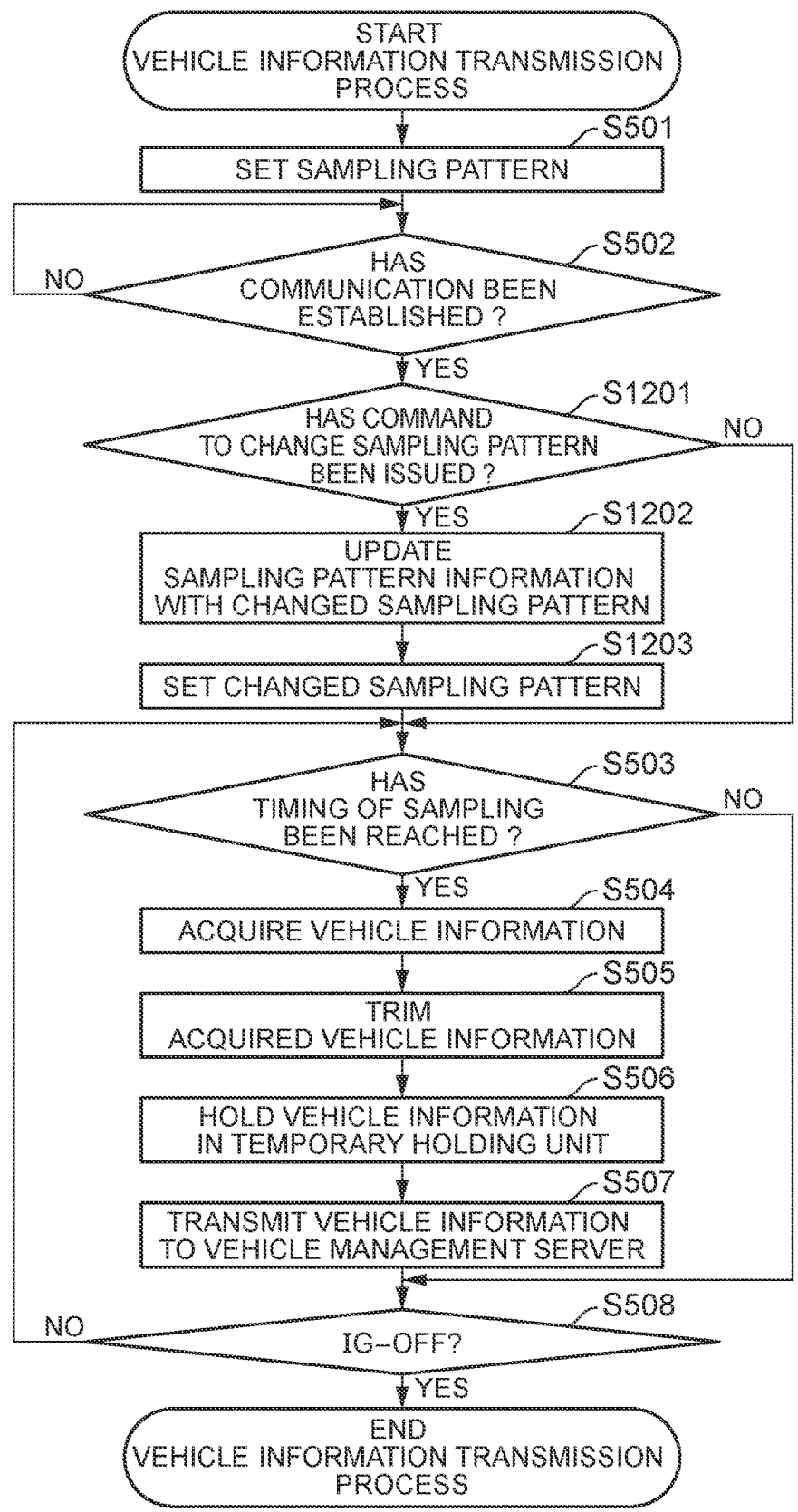
FIG. 12 is a flowchart that shows the flow of a vehicle information transmission process.

Next, the flow of the vehicle information transmission process that is executed by the vehicle information transmission system 130 according to the second embodiment will be described. FIG. 12 is a flowchart that shows the flow of the vehicle information transmission process. The difference from the flowchart of the vehicle information transmission process shown in FIG. 5 will be described. The flowchart of the vehicle information transmission process shown in FIG. 12 differs from the flowchart of the vehicle information transmission process shown in FIG. 5 in step S1201 to step S1203.

As communication is established with the vehicle management server 610, the sampling pattern management unit 303 determines in step S1201 whether a sampling pattern change command has been received from the vehicle management server 610. When it is determined in step S1201 that no sampling pattern change command has been received, the process proceeds to step S503.

On the other hand, when it is determined in step S1201 that a sampling pattern change command has been received, the process proceeds to step S1202. In step S1202, the sampling pattern management unit 303 extracts the sampling pattern management information contained in the received sampling pattern change command, and updates the sampling pattern information 330 in the sampling pattern storage unit 311.

In step S1203, the sampling pattern management unit 303 sets the sampling pattern in the vehicle information acquisition unit 304 on the basis of the extracted sampling pattern management information. Thus, the sampling pattern into which the vehicle management server 610 has issued a command to change the sampling pattern is set in the vehicle information acquisition unit 304.

8. Conclusion

As is apparent from the above description, in the vehicle information collection system 600 according to the present embodiment, the vehicle management server is configured to determine whether a change of the sampling pattern is required on the basis of the collected vehicle information. When it is determined that a change of the sampling pattern is required, the vehicle management server is configured to issue a command to change the sampling pattern.

Thus, the vehicle information transmission system 130 is able to acquire vehicle information on the basis of the sampling pattern into which the vehicle management server 610 issues a command to change the sampling pattern.

Third Embodiment

In the above-described second embodiment, a sampling pattern change command is transmitted at timing at which the vehicle 120 is placed in the IG-ON state and communication is established with the vehicle management server 610. In contrast, in a third embodiment, the configuration that a sampling pattern change command is transmitted at selected timing after IG-ON will be described.

Figure 13:
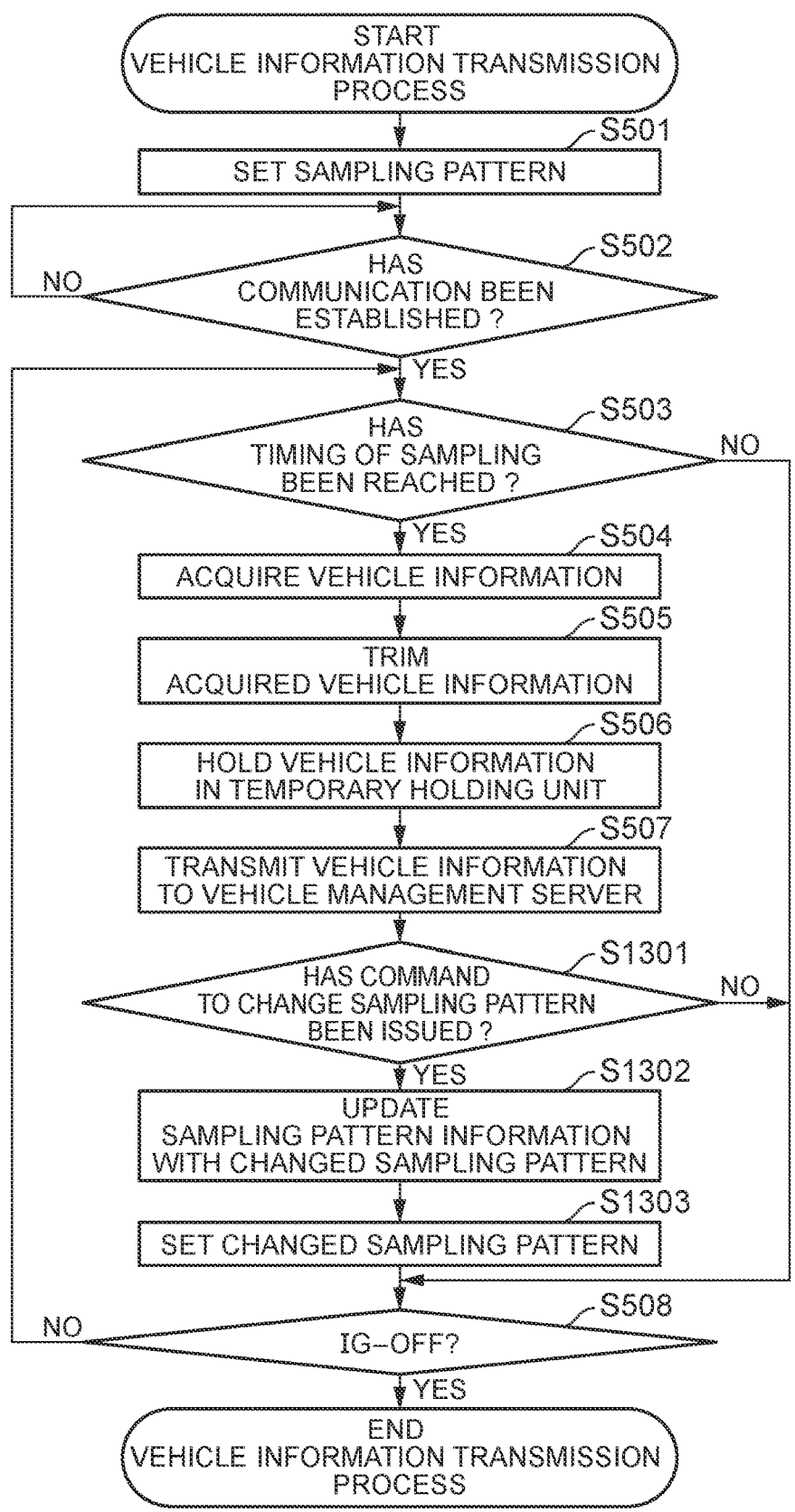
FIG. 13 is a flowchart that shows the flow of a vehicle information transmission process.

FIG. 13 is a flowchart that shows the flow of the vehicle information transmission process. The difference from the flowchart of the vehicle information transmission process shown in FIG. 5 will be described. The flowchart of the vehicle information transmission process shown in FIG. 13 differs from the flowchart of the vehicle information transmission process shown in FIG. 5 in step S1301 to step S1303.

As the transmission/reception control unit 302 transmits vehicle information to the vehicle management server 110 in step S507, the sampling pattern management unit 303 determines in step S1301 whether a sampling pattern change command has been received from the vehicle management server 610. When it is determined in step S1301 that no sampling pattern change command has been received, the process proceeds to step S508.

On the other hand, when it is determined in step S1301 that a sampling pattern change command has been received, the process proceeds to step S1302. In step S1302, the sampling pattern management unit 303 extracts the sampling pattern management information contained in the received sampling pattern change command, and updates the sampling pattern information 330 in the sampling pattern storage unit 311.

In step S1303, the sampling pattern management unit 303 sets the sampling pattern in the vehicle information acquisition unit 304 on the basis of the extracted sampling pattern management information. Thus, the sampling pattern into which the vehicle management server 610 has issued a command to change the sampling pattern is set in the vehicle information acquisition unit 304.

In this way, the vehicle information transmission system 130 is able to receive a command to change the sampling pattern from the vehicle management server 610 and change the sampling pattern at selected timing after the vehicle is placed in the IG-ON state.

Alternative Embodiments

In the above-described first to third embodiments, the transmission/reception control unit 302 sequentially reads vehicle information held in the temporary holding unit 312 and transmits the vehicle information to the vehicle management server 110 or the vehicle management server 610. However, the timing at which the transmission/reception control unit 302 reads vehicle information held in the temporary holding unit 312 is not limited to this timing. For example, vehicle information may be collectively read at intervals of a constant period.

In the above-described second and third embodiments, a sampling pattern change command containing sampling pattern management information is transmitted. However, information that is contained in a sampling pattern change command and is transmitted is not limited to this information. For example, a sampling pattern change command containing information ID that identifies the type of vehicle information for which a change of the sampling pattern is required and sampling pattern number that indicates the type of the changed sampling pattern may be transmitted. That is, information ID that identifies the type of vehicle information for which no change of the sampling pattern is required and sampling pattern number that indicates the type of unchanged sampling pattern may be transmitted without being contained in a sampling pattern change command.

In the above-described second and third embodiments, a sampling pattern is changed on the basis of a command from the vehicle management server 610. However, a sampling period may be changed on the basis of a command from the vehicle management server 610. As for the change point sampling pattern, the logic of detecting a change point may be changed on the basis of a command from the vehicle management server 610. That is, the vehicle information acquisition unit 304 may be configured to acquire vehicle information in accordance with a sampling method based on a command from the vehicle management server 610.

The disclosure is not limited to the configurations described here, such as the configurations described in the above embodiments and a combination of those configurations with other elements. These configurations may be modified without departing from the scope of the disclosure, and may be appropriately determined in accordance with the mode of application.

What is claimed is:

1. A vehicle information transmission system that carries out communication with a management server that manages a vehicle, the vehicle information transmission system comprising:
an in-vehicle device configured to
acquire vehicle information in accordance with a third sampling pattern that is a combination of a first sampling pattern and a second sampling pattern, the vehicle information being transferred within an in-vehicle network installed in the vehicle, the first sampling pattern being a change point sampling pattern in which the vehicle information is sampled at a change point at which a change in the vehicle information per unit time becomes larger than a predetermined value, the second sampling pattern being a simple sampling pattern in which the vehicle information is sampled at intervals of a predetermined sampling period, and
transmit the acquired vehicle information to the management server,
wherein the management server is configured to
perform an analysis on the acquired vehicle information, and
associate a change flag with the third sampling pattern when the management server determines the third sampling pattern is not to be appropriate based on the analysis on the acquired vehicle information, the change flag indicating that the third sampling pattern needs to be changed.

2. The vehicle information transmission system according to claim 1, wherein the in-vehicle device is configured to acquire the vehicle information in accordance with a sampling method based on a command from the management server.

3. The vehicle information transmission system according to claim 1, wherein when the in-vehicle device is configured to acquire the vehicle information in accordance with the third sampling pattern, the predetermined period is set so as to be longer than another predetermined period at which the vehicle information is acquired in accordance with only the second sampling pattern.

4. The vehicle information transmission system according to claim 3, wherein when the in-vehicle device is configured to acquire the vehicle information in accordance with the third sampling pattern, the predetermined period is set so as to be shorter in time interval than an interval at which the change point occurs.

5. The vehicle information transmission system according to claim 1, wherein the interval of the predetermined sampling period of the second sampling pattern is shorter in time than the unit time at which a change point occurs in the first sampling pattern.

* * * * *